(12) United States Patent
Tomikawa et al.

(10) Patent No.: US 7,364,371 B2
(45) Date of Patent: Apr. 29, 2008

(54) OPTICAL MODULE

(75) Inventors: Ichiro Tomikawa, Ebina (JP); Naoshi Kotake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/546,258

(22) Filed: Oct. 12, 2006

(65) Prior Publication Data
US 2007/0154150 A1    Jul. 5, 2007

(30) Foreign Application Priority Data
Jan. 4, 2006    (JP)    ............... 2006-000187

(51) Int. Cl.
  *G02B 6/36*   (2006.01)
  *H01L 29/205*   (2006.01)
  *H01L 33/00*   (2006.01)
  *H01L 29/22*   (2006.01)
(52) U.S. Cl. .............. 385/92; 385/31; 385/33; 385/88; 385/93; 385/94; 362/237; 362/249; 362/555; 362/581; 257/88; 257/91; 257/95; 257/98; 257/99; 257/100
(58) Field of Classification Search ............... 385/92; 257/91, 95
See application file for complete search history.

(56) References Cited

U.S. PATENT DOCUMENTS

| 6,302,596 B1 * | 10/2001 | Cohen et al. ............... 385/93 |
| 6,335,548 B1 * | 1/2002 | Roberts et al. ............. 257/98 |
| 6,358,066 B1 * | 3/2002 | Gilliland et al. .......... 439/76.1 |
| 6,532,155 B2 * | 3/2003 | Green et al. ............... 361/733 |
| 6,623,179 B2 * | 9/2003 | Hurt et al. .................... 385/92 |
| 6,860,647 B2 * | 3/2005 | Yamabayashi et al. ....... 385/88 |
| 7,182,526 B1 * | 2/2007 | Wittl et al. .................... 385/89 |

FOREIGN PATENT DOCUMENTS

JP    8-15541    1/1996

* cited by examiner

*Primary Examiner*—Frank G. Font
*Assistant Examiner*—Ryan Lepisto
(74) *Attorney, Agent, or Firm*—Morgan, Lewis & Bockius LLP

(57) ABSTRACT

An optical module has plural optical units each having an optical communication device that performs conversion between an electrical signal and an optical signal, and a socket that the optical communication device is fitted in. The optical units are aligned and detachably connected to each other by a part of the socket in contact with the socket of the adjacent optical unit.

1 Claim, 3 Drawing Sheets

OPTICAL MODULE

BACKGROUND (i) Technical Field

The present invention relates to an optical module that has an optical communication device and a socket that the optical communication device is fitted in.

(ii) Related Art

In recent years, optical communication has been performed using optical fibers and an optical communication device that includes a head performing conversion between an electrical signal and an optical signal, and a metallic lead extending from the head and transmitting an electrical signal.

SUMMARY

According to an aspect of the present invention, an optical module has plural optical units each having an optical communication device that performs conversion between an electrical signal and an optical signal, and a socket that the optical communication device is fitted in, the optical units being aligned and detachably connected to each other by a portion of the socket in contact with the socket of the adjacent optical unit.

BRIEF DESCRIPTION OF THE DRAWINGS

Exemplary embodiment(s) of the present invention will be described in detail based on the following figures, wherein.

DETAILED DESCRIPTION

The exemplary embodiment of the invention will be described below with reference to the accompanying drawings.

Figure 1:
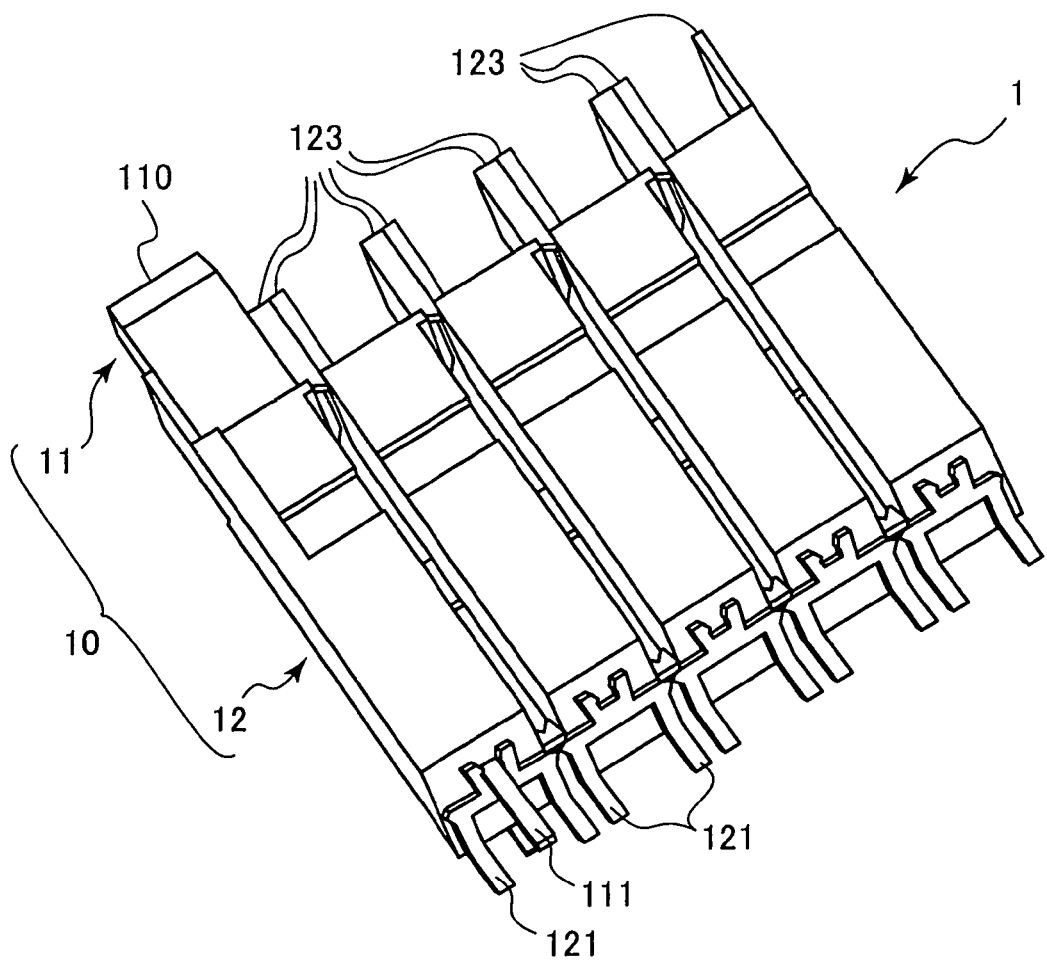
FIG. 1 shows an external perspective view of an optical module according to one exemplary embodiment of the invention.

FIG. 1 shows an external perspective view of an optical module 1 according to the exemplary embodiment of the invention.

The optical module 1 of FIG. 1 is composed of five optical units 10 detachably arranged in order. Each of five optical units 10 has an optical communication device 11, however, the optical communication devices of the optical units 10 other than the leftmost are omitted in FIG. 1 for the sake of convenience.

The optical unit 10 is composed of an optical communication device 11 and a socket 12 with openings 12a (see FIG. 3) that receive the optical communication device 11. The optical communication device 11 is composed of a head 110 that performs conversion between an electrical signal and an optical signal, and two leads 111 that extend from the head 110 and transmits an electrical signal. FIG. 1 also shows an electrode 121 connected to one of the two leads 111.

Interference prevention walls 123 are disposed between adjacent sockets 12. Each of the interference prevention walls 123 extends to the front side of the optical module 1 and in parallel to an optical axis of the optical communication device 11 so as to prevent interference in an optical signal by the optical communication device 11 of its adjacent optical unit(s) 10.

Figure 2:
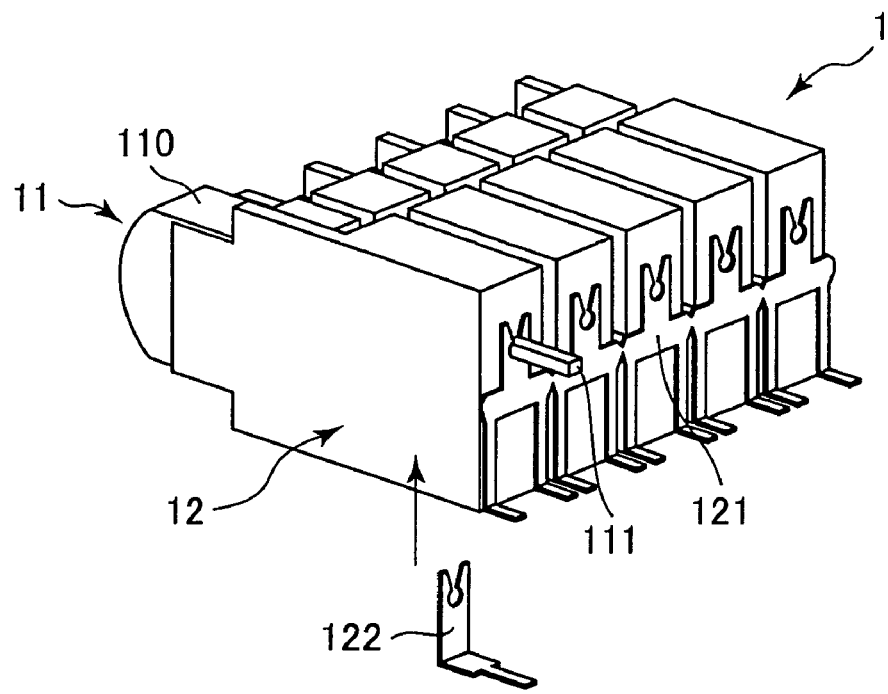
FIG. 2 shows an external perspective view of the optical module shown in FIG. 1 as viewed from its back.

FIG. 2 shows an external perspective view of the optical module 1 as viewed from its back.

Figure 3:
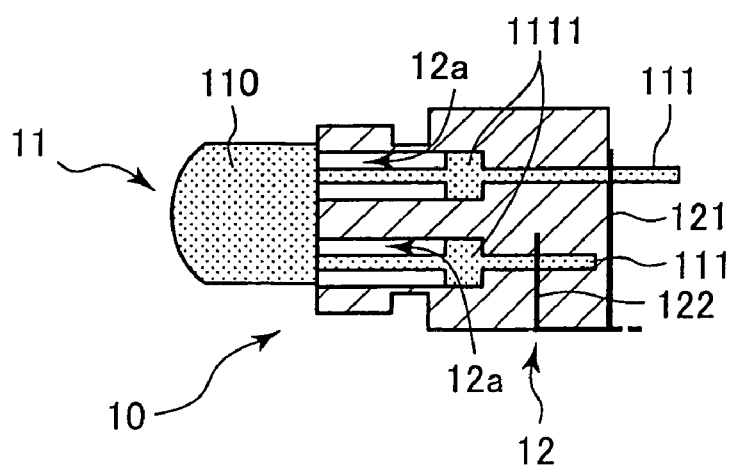
FIG. 3 shows a sectional view of an optical unit constituting part of the optical module according to the exemplary embodiment.

FIG. 2 shows the other electrode 122 connected to the other lead 111 (also see FIG. 3).

FIG. 3 shows a sectional view of the optical unit 10 constituting part of the optical module 1 according to the exemplary embodiment.

FIG. 3 shows the state where the leads 111 are fitted in the openings 12a formed in the socket 12 of the optical unit 10. As shown in FIG. 3, the leads 111 each have a rectangular portion 1111. The rectangular 1111 is fitted in each of the openings 12a so that the lead 111 is positioned to the socket 12.

FIG. 3 also shows that the leads 111 fitted in the openings 12a are respectively in contact with the electrodes 121 and 122 that are attached to the socket 12.

Figure 4:
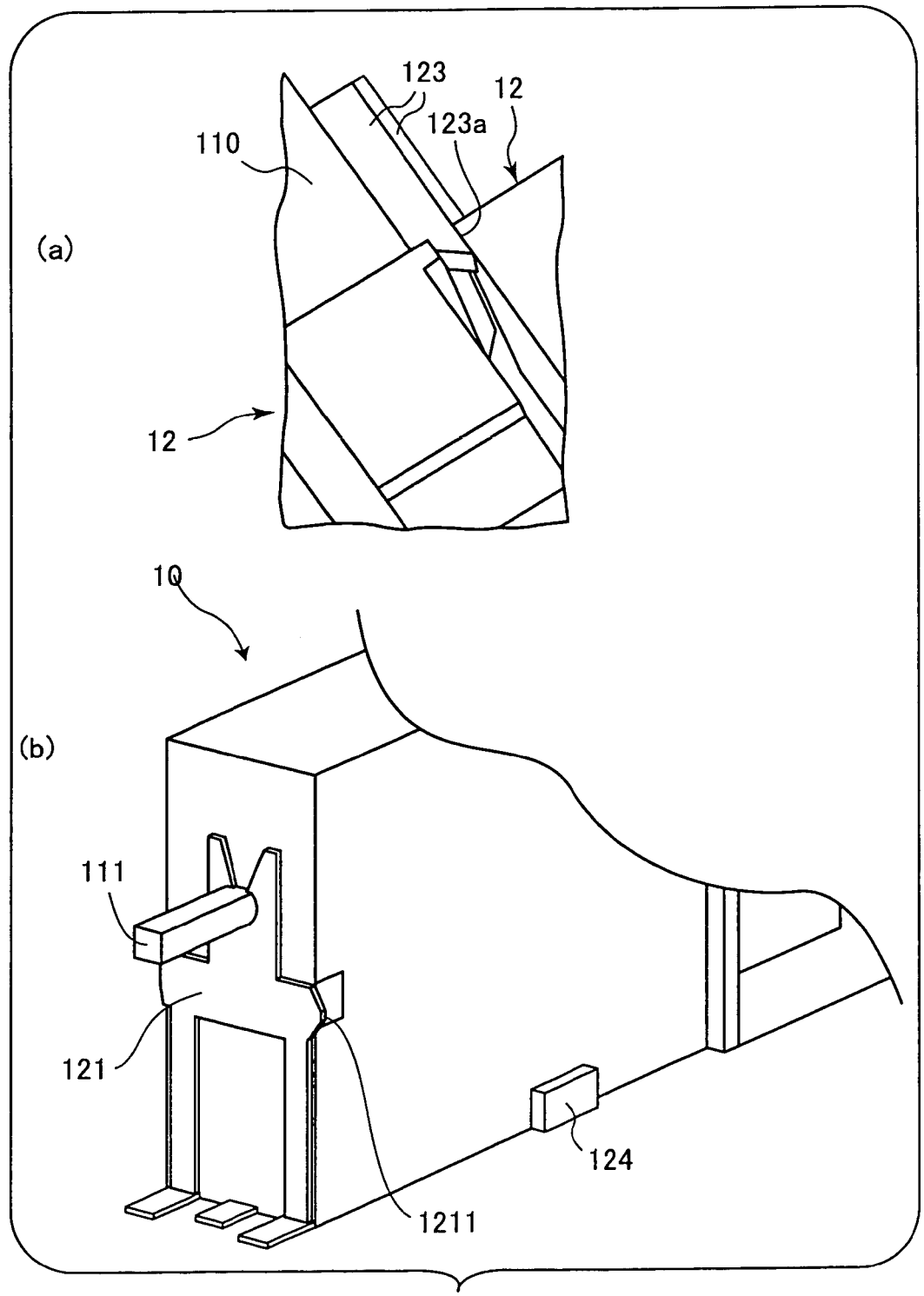
FIG. 4 shows the state where adjacent optical units are detachably connected.

Part (a) and part (b) of FIG. 4 show the state where adjacent optical units are detachably connected. Part (b) of FIG. 4 shows the remaining part of the optical unit 10 that is not shown in part (a) of FIG. 4. In part (b) of FIG. 4, an adjacent optical unit is not indicated for the sake of convenience.

Referring to part (a) of FIG. 4, a portion 123a of the interference prevention wall 123 of the socket 12 is connected to the adjacent socket 12. As shown in part (b) of FIG. 4, a convex portion 124 formed at the bottom of a flank of the socket 12 and an end portion 1211 of the electrode 121 are detachably attached thereto and used for connection with the adjacent socket 12.

According to the exemplary embodiment, if, for example, an optical module of four optical units is required, one out of the five optical units 10 is to be detached. At that time, force is applied at first to the portion 123a of the interference prevention wall 123 disposed in the front side of the optical unit 10, to separate the portion 123a from its adjacent optical unit 12. Then, the convex portion 124 and the end portion 1211 of the electrode 121 are cut off.

In the above-described embodiment, five optical units 10 are detachably aligned, however, the present invention is not limited thereto and may have another number of optical units. Or, the interference prevention wall 123 may not be provided in the optical module 1. Such modification does not substantially deteriorate the effect of the invention. Additionally, the portion to be connected may be other than the portion 123a of the interference prevention wall 123, the convex portion 124 formed at the bottom of the flank of the socket 12 and the end portion 1211 of the electrode 121, as long as part of adjacent sockets are connected to each other.

The foregoing description of the exemplary embodiment(s) of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An optical module comprising:

a plurality of optical units each having an optical communication device that performs conversion between an electrical signal and an optical signal and a socket that the optical communication device is fitted in, the optical units being aligned and detachably connected to each other by a portion of the socket in contact with a socket of an adjacent optical unit, wherein the optical communication device includes a head that performs conversion between an electrical signal and a n optical signal, and two metallic leads that extend from the head and transmits an electrical signal, each of the optical units has an electrode that is attached to the socket and is in contact with one of the two leads, and a plurality of the electrodes are aligned corresponding to the aligned optical units and adjacent electrodes are partially and detachably connected to each other.

* * * * *